(12) United States Patent
Hadinata et al.

(10) Patent No.: US 10,903,767 B2
(45) Date of Patent: Jan. 26, 2021

(54) SYNCHRONOUS MOTOR CONTROL APPARATUS

(71) Applicant: Hitachi Industrial Equipment Systems Co., Ltd., Tokyo (JP)

(72) Inventors: Agnes Hadinata, Tokyo (JP); Yoshitaka Iwaji, Tokyo (JP); Kazuaki Tobari, Tokyo (JP); Yusaku Onuma, Tokyo (JP); Takuya Sugimoto, Tokyo (JP); Masato Ohya, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 16/483,813

(22) PCT Filed: Mar. 2, 2018

(86) PCT No.: PCT/JP2018/008045
§ 371 (c)(1),
(2) Date: Aug. 6, 2019

(87) PCT Pub. No.: WO2018/180203
PCT Pub. Date: Oct. 4, 2018

(65) Prior Publication Data
US 2020/0052620 A1    Feb. 13, 2020

(30) Foreign Application Priority Data
Mar. 27, 2017    (JP) .................... 2017-060354

(51) Int. Cl.
*H02P 6/18*    (2016.01)
(52) U.S. Cl.
CPC .......... *H02P 6/181* (2013.01); *H02P 2203/05* (2013.01)

(58) Field of Classification Search
CPC .................. H02P 6/181; H02P 2203/05
(Continued)

(56) References Cited

U.S. PATENT DOCUMENTS 4,712,050 A * 12/1987 Nagasawa ............... H02P 6/182
                                                          318/400.04
7,166,975 B2 * 1/2007 Mori ........................ H02P 6/16
                                                          318/400.13

(Continued)

FOREIGN PATENT DOCUMENTS

JP    2004-280563 A    10/2004
JP    2013-59197 A    3/2013

(Continued)

OTHER PUBLICATIONS

International Search Report (PCT/ISA/210) issued in PCT Application No. PCT/JP2018/008045 dated May 29, 2018 with English translation (four (4) pages).

(Continued)

*Primary Examiner* — David Luo
(74) *Attorney, Agent, or Firm* — Crowell & Moring LLP (57) ABSTRACT

According to the present invention, in position sensorless control for switching between a 120-degree energization scheme for a low-speed region and a 180-degree energization scheme for a mid-to-high-speed region, stable and highly accurate speed control characteristics are provided by suppressing speed deviation $\Delta\omega r$ in the low-speed region, and by preventing current jump-up caused by a discontinuous rotational speed occurring during switching to the mid-to-high-speed region. In the case of driving in the 120-degree energization scheme, a voltage command value is corrected such that an estimated speed value or a detected speed value follows a speed command.

7 Claims, 13 Drawing Sheets

(58) Field of Classification Search
USPC .............................. 318/400.32, 400.01, 700
See application file for complete search history.

(56) References Cited

U.S. PATENT DOCUMENTS

| | | | | |
|---|---|---|---|---|
| 8,054,024 B2 * | 11/2011 | Hayashi | .................... | H02P 6/18 |
| | | | | 318/400.34 |
| 2006/0208683 A1 | 9/2006 | Ide | | |

FOREIGN PATENT DOCUMENTS

| JP | 5972138 B2 | 8/2016 |
|---|---|---|
| JP | 6002643 B2 | 10/2016 |

OTHER PUBLICATIONS

Japanese-language Written Opinion (PCT/ISA/237) issued in PCT Application No. PCT/JP2018/008045 dated May 29, 2018 (four (4) pages).

* cited by examiner

[FIG. 1]

FIG. 2A        FROM V PHASE TO W PHASE

FIG. 2B        FROM W PHASE TO V PHASE

SYNCHRONOUS MOTOR CONTROL APPARATUS

TECHNICAL FIELD

The present invention relates to a synchronous motor control apparatus, and to a synchronous motor control apparatus that estimates a rotor position to control a rotational speed and a torque.

BACKGROUND ART

For a control apparatus of a synchronous motor which drives a fan, a pump, a compressor, a conveyor, an elevator, or the like, there are two types of methods of detecting the position of a rotor using a position sensor such as a Hall IC or an encoder, or estimating the position of a rotor by sensorless control without using the position sensor (PTL 1).

As the related art, as described in Japanese Patent No. 5972138 (PTL 2), a synchronous motor is controlled by adopting a 120-degree energization scheme in which the current of the synchronous motor is a square wave, in a low-speed region, and switching the energization scheme to a 180-degree energization scheme in which the current is a sinusoidal wave, in a mid-to-high-speed region.

CITATION LIST

Patent Literature

PTL 1: Japanese Patent No. 6002643 (JP-A-2015-53800)
PTL 2: Japanese Patent No. 5972138 (JP-A-2014-79041)

SUMMARY OF INVENTION

Technical Problem

The method of PTL 1 can realize high torque without step-out even in a stopped state of a synchronous motor, but the current becomes a rectangular wave and torque ripple is generated. Therefore, it is conceivable to switch to the 180-degree energization scheme in the mid-to-high-speed region where an induced voltage can be detected. When switched to a different energization scheme, speed fluctuation, current jump-up, or the like occurs. According to the method of PTL 2, the voltage to be applied is controlled so that it will change continuously before and after switching of the energization scheme. Since speed control is not performed in the low-speed region driven in the 120-degree energization scheme, when load torque is applied, a deviation occurs between the rotational speed command value and the rotational speed. On the other hand, in the mid-to-high-speed region driven in the 180-degree energization scheme, vector control is applied, so a speed deviation does not occur even when the load torque is applied.

That is, since the rotational speed when driven in the 120-degree energization scheme or the 180-degree energization scheme is discontinuous, a speed fluctuation, a current jump-up, and the like occur.

In the present invention, the speed control is performed even in the 120-degree energization scheme, and the speed deviation is made zero such that the rotational speed matches the rotational speed command value. That is, there is provided a control apparatus in which by making the speed deviation zero, continuity of the rotational speed is maintained in the 120-degree energization scheme and the 180-degree energization scheme, and stable and highly accurate speed control characteristics without current jump-up can be realized.

Solution to Problem

The present invention relates to a synchronous motor control apparatus which drives a synchronous motor in a 120-degree energization scheme, according to a rotational speed command value, by using a power converter that drives a synchronous motor, the synchronous motor control apparatus including means for detecting a position of a rotor of the synchronous motor directly or by estimation, in which an internal command value of the control apparatus is corrected based on a deviation between a value of the detected position and a phase command value obtained by integrating the rotational speed command value.

Advantageous Effects of Invention

According to the present invention, continuity of the rotational speed is maintained in the 120-degree energization scheme and the 180-degree energization scheme, and stable and highly accurate speed control characteristics without current jump-up can be realized.

DESCRIPTION OF EMBODIMENTS

The configuration and operation of a synchronous motor control apparatus will be described below with reference to FIGS. 1 to 14 regarding the configuration of the present invention. Further, the present invention is not limited to the following embodiments, and various modification examples and application examples of the technical concept of the present invention are included within the scope thereof. Hereinafter, examples will be described with reference to the drawings.

First Example

Figure 1:
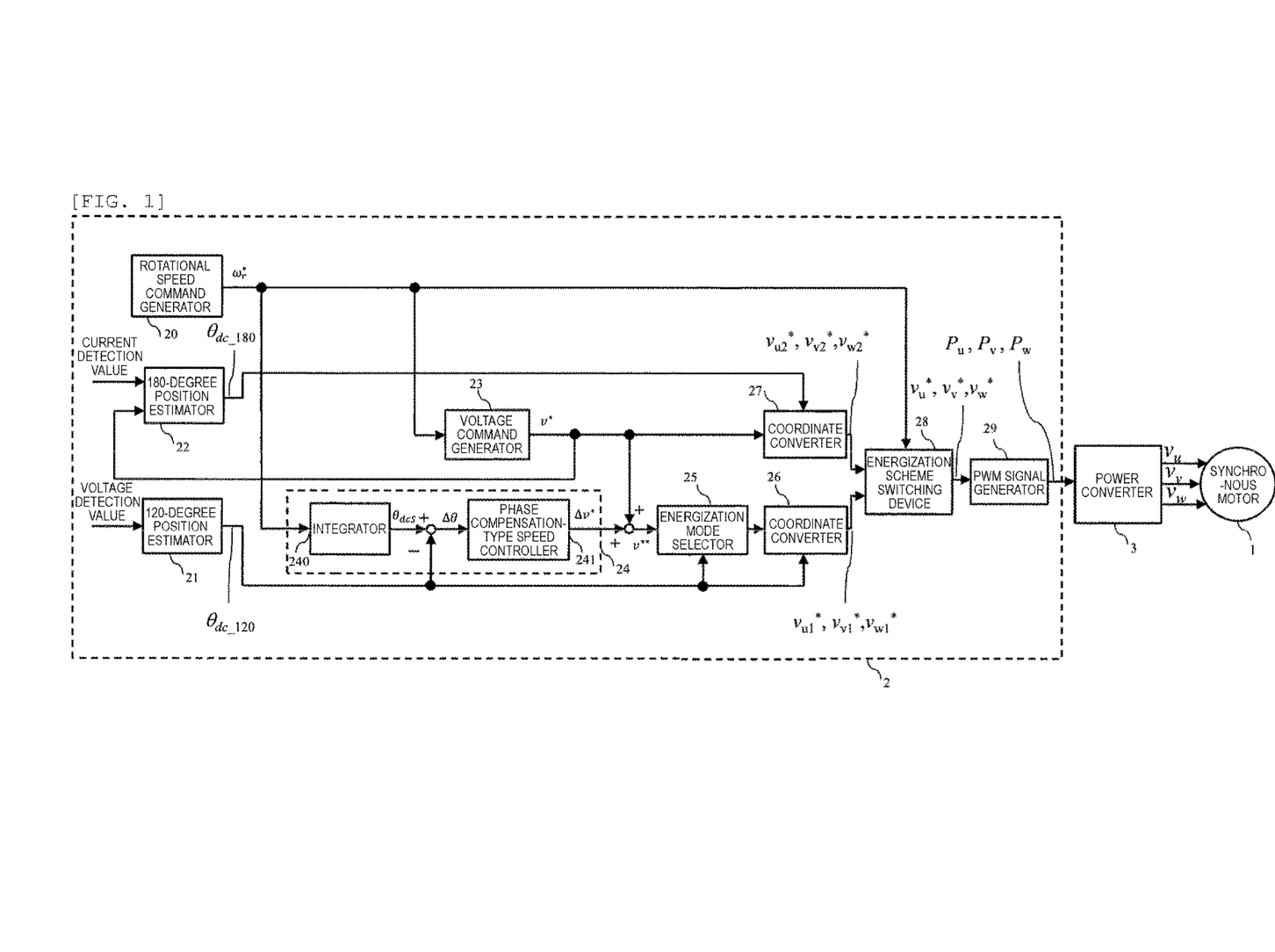
FIG. 1 is a configuration diagram of a first embodiment of a control apparatus according to the present invention.

FIG. 1 shows a first embodiment of the present invention.

In this example, a rotor position in a low-speed region is detected by position sensorless control of a 120-degree energization scheme.

A synchronous motor 1 is a permanent magnet synchronous motor having a permanent magnet in a rotor, and generates a torque by a magnet magnetic flux and a current of a torque current component (q axis) orthogonal to a magnetic flux component (d axis).

The controller 2 calculates three-phase voltage command values $v_u^*$, $v_v^*$, and $v_w^*$ from the voltage command values $v_{dc}^*$ and $v_{qc}^*$ of the d axis and the q axis, which are voltage command value $v^*$, and outputs signals $P_u$, $P_v$, and $P_w$ obtained by converting them into pulse widths.

The power converter 3 outputs voltage values in proportion to the pulse width signals $P_u$, $P_v$, and $P_w$, and varies the output voltage and the output frequency of the synchronous motor 1.

Next, the configuration of the controller 2 will be described.

The rotational speed command generator 20 outputs the rotational speed command value $\omega_r^*$ of the synchronous motor 1.

The 120-degree position estimator 21 outputs the estimated value $\theta_{dc\_120}$ of the rotor position in the low-speed region by using the voltage detection values $E_{ou}$, $E_{Ov}$, and $E_{ow}$.

The 180-degree position estimator 22 outputs the estimated value $\theta_{dc\_180}$ of the rotor position in the mid-to-high-speed region by using the voltage commands $v_{dc}^*$ and $v_{qc}^*$ of the d axis and the q axis and the current detection values $I_{dc}$ and $I_{qc}$.

The voltage command generator 23 outputs the voltage command values $v_{dc}^*$ and $v_{qc}^*$ of the d axis and the q axis which are voltage command values $v^*$ by using the electric constant of the synchronous motor 1 and the rotational speed command value $\omega_r^*$.

The voltage command compensator 24, which is a feature of the present invention, receives the rotational speed command value $\omega_r^*$ and the estimated value $\theta_{dc\_120}$ of the rotor position, and outputs the voltage correction value $\Delta v^*$.

The internal configuration of voltage command compensator 24 will be described. The phase deviation $\Delta\theta$ between the phase command value $\theta_{dcs}$ obtained by integrating $\omega_r^*$ by the integrator 240 and the estimated value $\theta_{dc\_120}$ of the rotor position is calculated, and the phase compensation-type speed controller 241 calculates proportional integral (PI) control to calculate the voltage correction value $\Delta v$.

The energization mode selector 25 determines any two energization phases of the u, v, and w phases of the synchronous motor 1 when driving in the 120-degree energization scheme.

The coordinate converter 26 converts the voltage command values $v_{dc}^*$ and $v_{qc}^{**}$ of the d axis and the q axis in the 120-degree energization scheme into the three-phase voltage command values $v_{u1}^*$, $v_{v1}^*$, and $v_{w1}^*$, and outputs the converted values.

The coordinate converter 27 converts the voltage command values $v_{dc}^*$ and $v_{qc}^*$ of the d axis and the q axis in the 180-degree energization scheme into the three-phase voltage command values $v_{u2}^*$, $v_{v2}^*$, and $v_{w2}^*$, and outputs the converted values.

If the magnitude of rotor speed command $\omega_r^*$ is 10% or less of the rated speed of synchronous motor 1, the energization scheme switching device 28 determines that the motor is in the low speed region and selects the voltage command values $v_{u1}^*$, $v_{v1}^*$, and $v_{w1}^*$, and if the magnitude of $\omega_r^*$ is 10% or more of the rated speed, and outputs the selected values as $v_u^*$, $v_v^*$, and $v_w^*$, it determines that the motor is in the mid-to-high-speed region and selects $v_{u2}^*$, $v_{v2}^*$, and $v_{w2}^*$.

The PWM signal generator 29 outputs the pulse width signals $P_u$, $P_v$, and $P_w$ corresponding to the input three-phase voltage command values $v_u^*$, $v_v^*$, and $v_w^*$.

The basic operation in the present example will now be described.

First, in the low speed range, a method of estimating the rotor position based on the magnetic saturation induced voltage of PTL 2 used in the 120-degree position estimator 21 will be described.

Figure 2A:
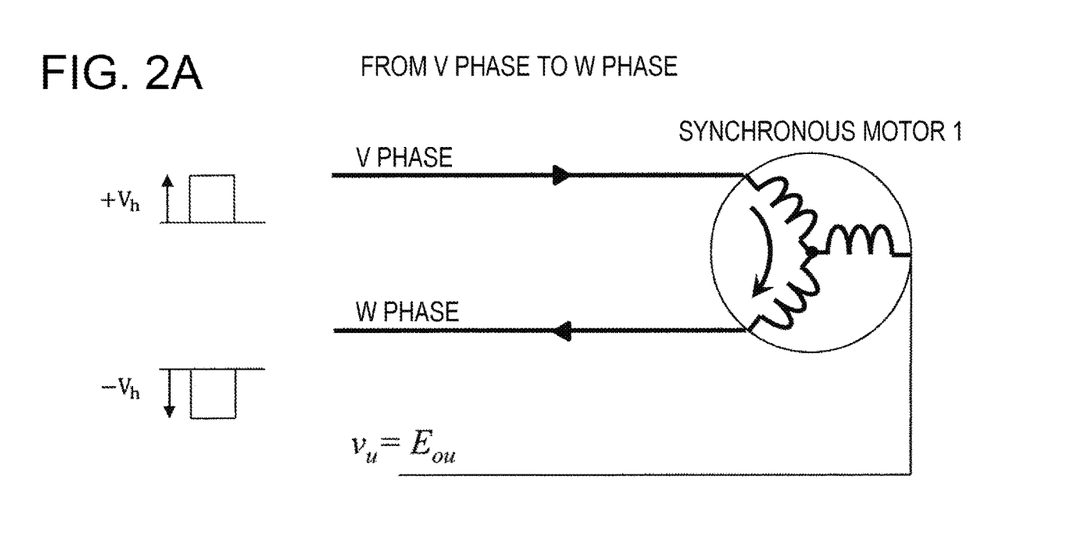
FIGS. 2A and 2B are explanatory diagrams in a case where a voltage is applied to a two-phase winding of a synchronous motor.
Figure 2B:
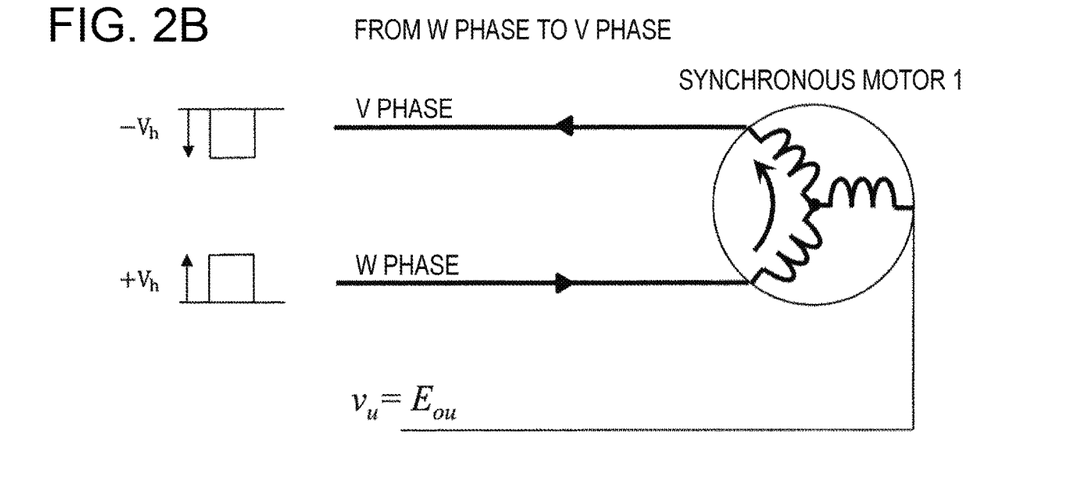

In the 120-degree energization scheme, a voltage is applied to two phases of the three-phase winding of the synchronous motor 1. FIGS. 2(a) and 2(b) are explanatory diagrams in the case where current is passed from V phase to W phase, and from W phase to V phase, respectively. At this time, a voltage corresponding to the rotor position is generated in U phase which is an open phase to which a voltage is not applied. This voltage is a magnetic saturation induced voltage generated when the inductance in the motor slightly changes due to the relationship between the magnetic flux from the permanent magnet of the synchronous motor 1 and the energization current.

Figure 3:
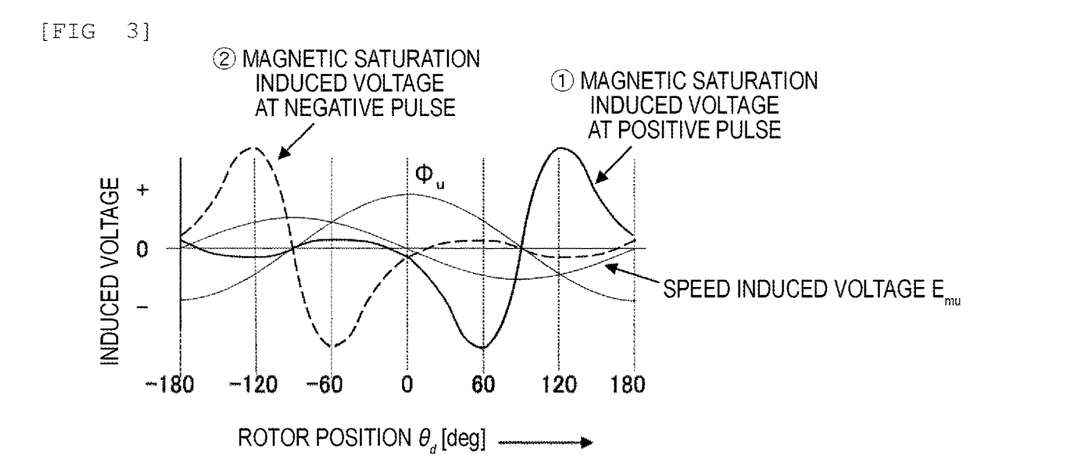
FIG. 3 is a characteristic diagram of magnetic saturation induced voltage.

FIG. 3 shows the relationship between the magnetic saturation induced voltage and the rotor position $\theta_d$. In FIG. 3, (1) shown by a solid line is the magnetic saturation induced voltage when a positive pulse is applied from V phase to W phase, and (2) shown by a broken line is the magnetic saturation induced voltage when a negative pulse is applied from W phase to V phase.

Figure 4:
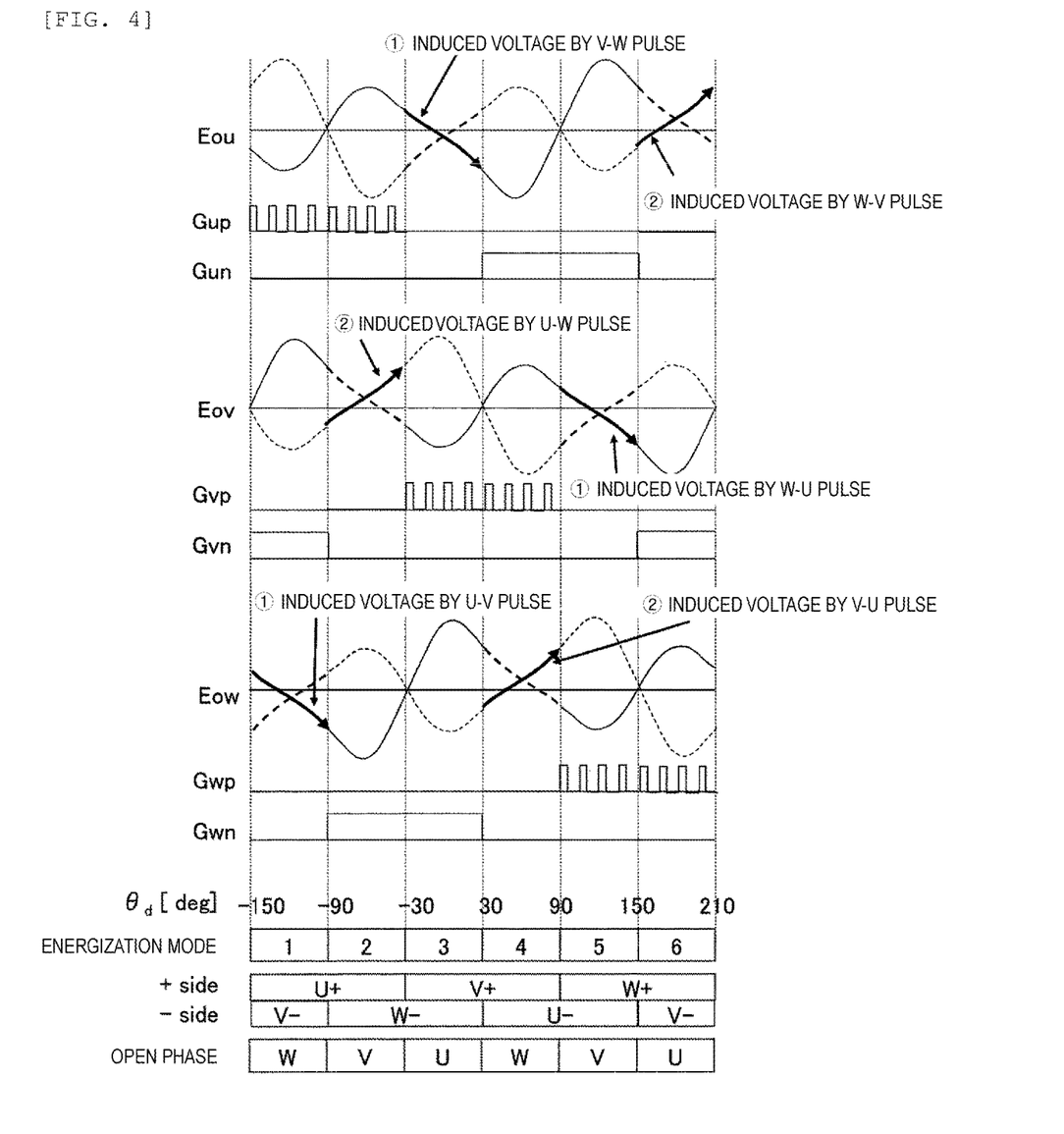
FIG. 4 is a characteristic diagram of the magnetic saturation induced voltage with respect to the rotor position.

FIG. 4 shows magnetic saturation induced voltages $E_{ou}$, $E_{ov}$, and $E_{ow}$ with respect to the rotor position $\theta_d$, gate signals $G_{up}$ to $G_{wn}$ of the switching elements constituting the power converter 3, a rotor position 74 $_d$, an energization mode, and a phase relationship of switching, in a case where each phase of U phase, V phase, and W phase are opened.

Figure 5:
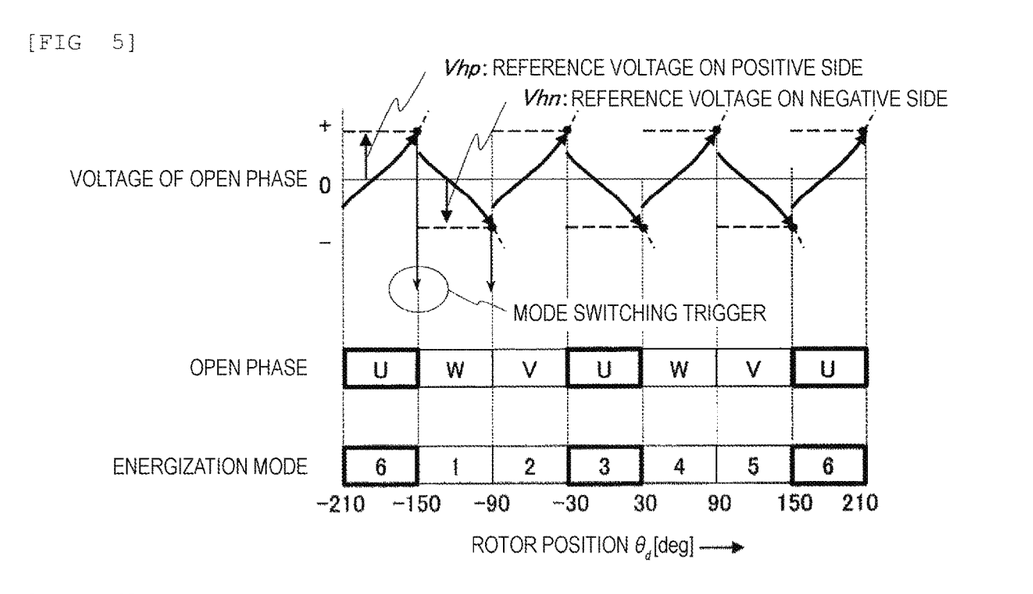
FIG. 5 is an explanatory diagram of a relationship between the magnetic saturation induced voltage and a reference voltage with respect to a rotor position.

FIG. 5 is a waveform of each part in 3 and 6 of the energization mode in FIG. 4. The induced voltage of U phase becomes like a thick arrow on $E_{ou}$. That is, it is observed that a magnetic saturation induced voltage decreases in the negative direction in the energization mode 3 and increases in the positive direction in the energization mode 6. Every time the energization mode is switched, the induced voltage becomes a waveform that repeats positive and negative rising and decreasing, respectively. Therefore, position sensorless control is realized by setting reference voltages ($V_{hp}$ and $V_{hn}$) that are threshold values on the positive side and negative side, respectively, and estimating the rotor position $\theta_d$ from the magnitude relationship between the reference voltage and the magnetic saturation induced voltage of the open phase. Here, the voltage command values $v^*$ in the low-speed region and the mid-to-high-speed region calculated by the voltage command generator 23 will be described.

In the case of driving in the 120-degree energization scheme in the low-speed region, the d-axis voltage command value $v_{dc}^*$ is zero, and only the q-axis voltage command value $v_{qc}^*$ is calculated, as shown in Expression (1).

[Expression 1]

$$\left.\begin{array}{l} v_{dc}^* = 0.0 \\ v_{qc}^* = \omega_r^* K_e \end{array}\right\} \quad (1)$$

Here, Ke is an induced voltage coefficient.

In the case of driving in the 180-degree energization scheme in the mid-to-high-speed region, the voltage command values $v_{dc}^*$ of the d axis and the q axis are calculated, as shown in Expression (2).

[Expression 2]

$$v_{dc}^* = RI_d^* - \omega_r^* L_q I_q^*$$

$$v_{qc}^* = RI_q^* + \omega_r^* L_d I_d + \omega_r^* K_e \quad (2)$$

Here, R is a winding resistance, $L_d$ is a d-axis inductance, $L_q$ is a q-axis inductance, $I_d^*$ is a d-axis current command value, and $I_q^*$ is a current obtained by applying a first-order delay process having a time constant T to a q-axis current detection value $I_{qc}$.

Figure 6:
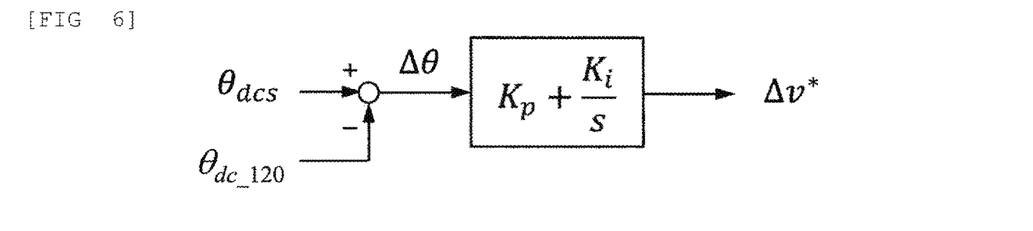
FIG. 6 is a configuration diagram of a phase compensation-type speed controller.

The voltage command compensator 24, which is a feature of the present invention, will be described.

The configuration of the voltage command compensator 24 is shown in FIG. 6. A voltage correction value $\Delta v^*$ is calculated by the PI controller, based on the phase deviation $\Delta\theta$ between the phase command value $\theta_{dcs}$ and the estimated value $\theta_{dc\_120}$ of the rotor position in the 120-degree energization scheme. Here, $K_p$ is a gain of proportional control, and $K_i$ is a gain of integral control.

A new $v_{qc}^{**}$ is calculated by replacing the voltage correction value $\Delta v^*$ with $\Delta v_q^*$, and adding $\Delta v_q^*$ to the voltage command value $v_{qc}^*$ of the q axis as shown in Expression (3).

[Expression 3]

$$\left.\begin{array}{l} v_{dc}^* = 0.0 \\ v_{qc}^* = v_{qc}^* + \Delta v_q^* \end{array}\right\} \quad (3)$$

Figure 7:
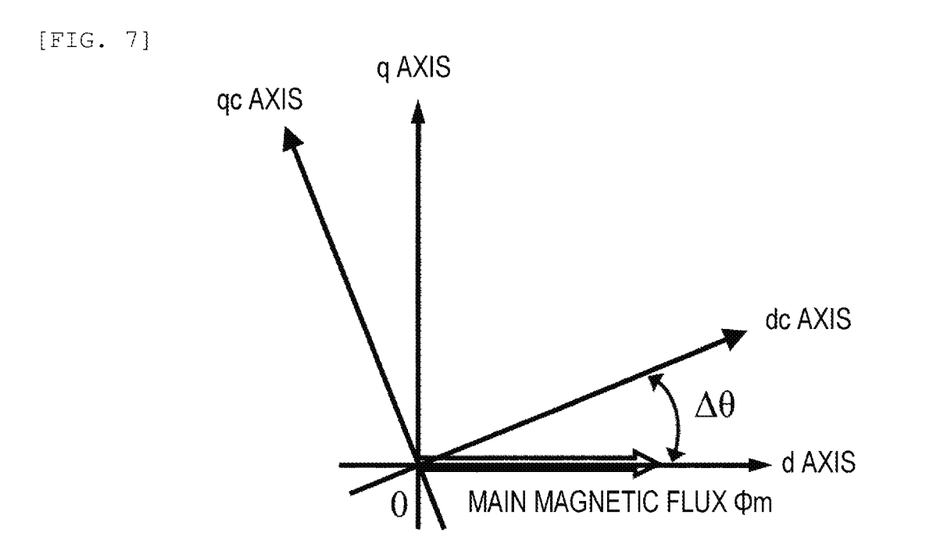
FIG. 7 is an explanatory diagram of a d-q axis rotational coordinate system.

Next, position sensorless control in the mid-to-high-speed region will be described.

d-q axes which are rotating coordinate systems, dc-qc axes handled by position sensorless control, and an axis error $\Delta\theta$ which is the phase difference between these axes will be described with reference to FIG. 7. The position of the rotor in the main magnetic flux direction is defined as the d axis, and the direction advanced by 90 degrees from the d axis is defined as the q axis. On the other hand, on the control axis, the estimated rotor position is defined as the dc axis, and the direction advanced by 90 degrees from the dc axis is defined as the qc axis. The phase difference between the d-q axes and the dc-qc axes is an axis error $\Delta\theta$.

Figure 8:
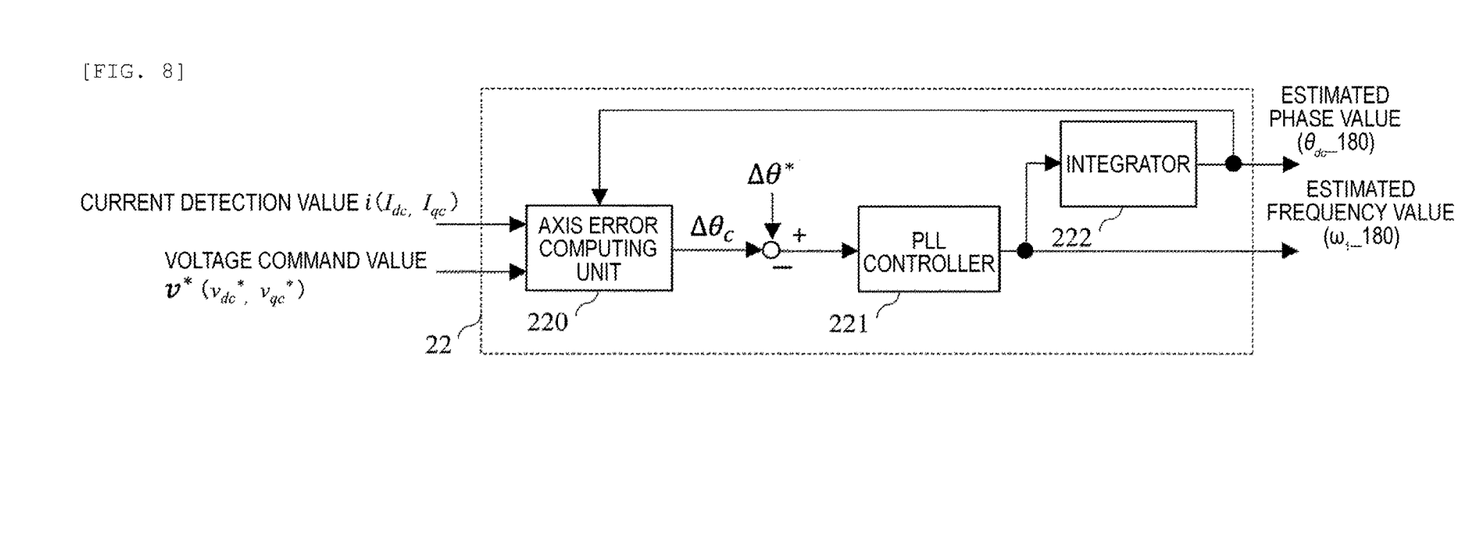
FIG. 8 is a configuration diagram of a 180-degree position estimator.

FIG. 8 shows an internal configuration of the 180-degree position estimator 22. An axis error computing unit 220 receives the current detection value $I_{dc}$, $I_{qc}$ of the dc-qc axes and the voltage command values $v_{dc}^*$ and $v_{qc}^*$, and calculates an estimated value $\Delta\theta_c$ of the axis error $\Delta\theta$ according to Expression (4).

[Expression 4]

$$\Delta\theta_c = \tan^{-1}\left(\frac{v_{dc}^* - RI_{dc} + \omega_1 L_q^* I_{qc}}{v_{qc}^* - RI_{qc} - \omega_1 L_q^* I_{dc}}\right) \quad (4)$$

The PLL controller 221 calculates the estimated speed value $\omega_{1\_180}$ by PI control such that the estimated value $\Delta\theta_c$ of the axis error follows the command value $\Delta\theta^*$ of the axis error which is zero. By integrating the estimated speed value $\omega_{1\_180}$ by the integrator 222, the estimated position value $\theta_{dc\_180}$ is calculated. Here, $\omega_{1\_180}$ corresponds to $\omega_1$ in Expression (4).

Figure 9:
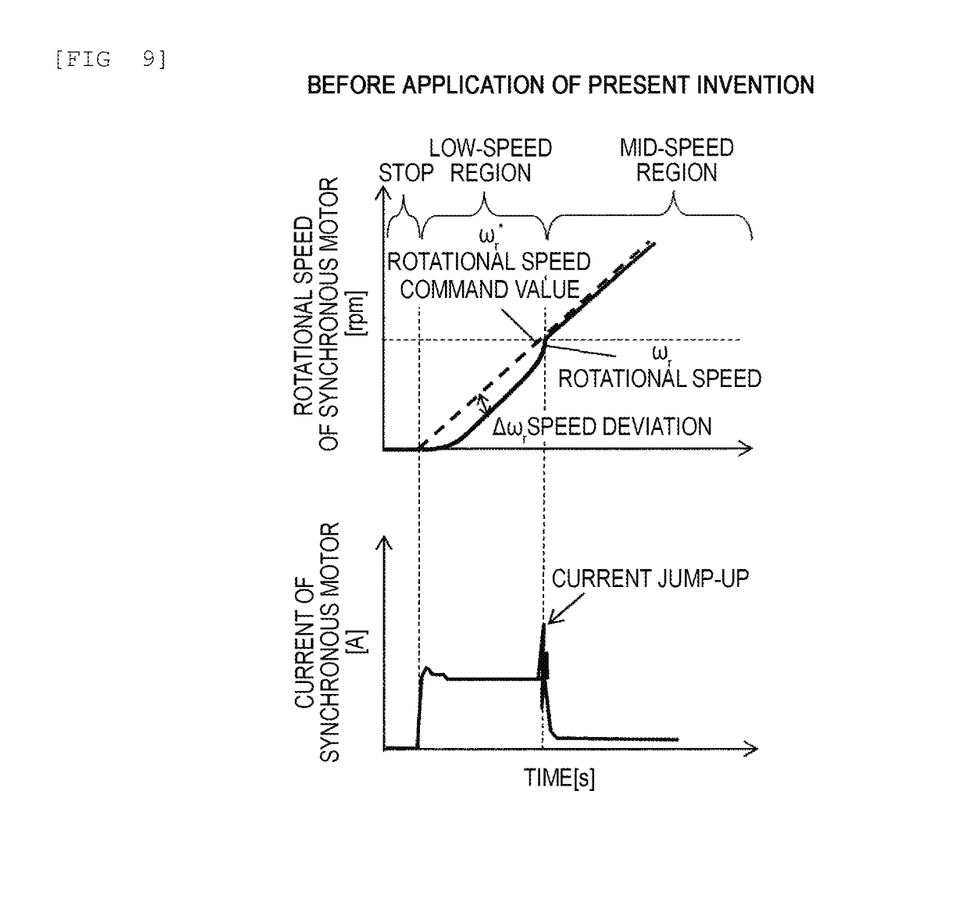
FIG. 9 is an acceleration characteristic diagram before application of the present invention.
Figure 10:
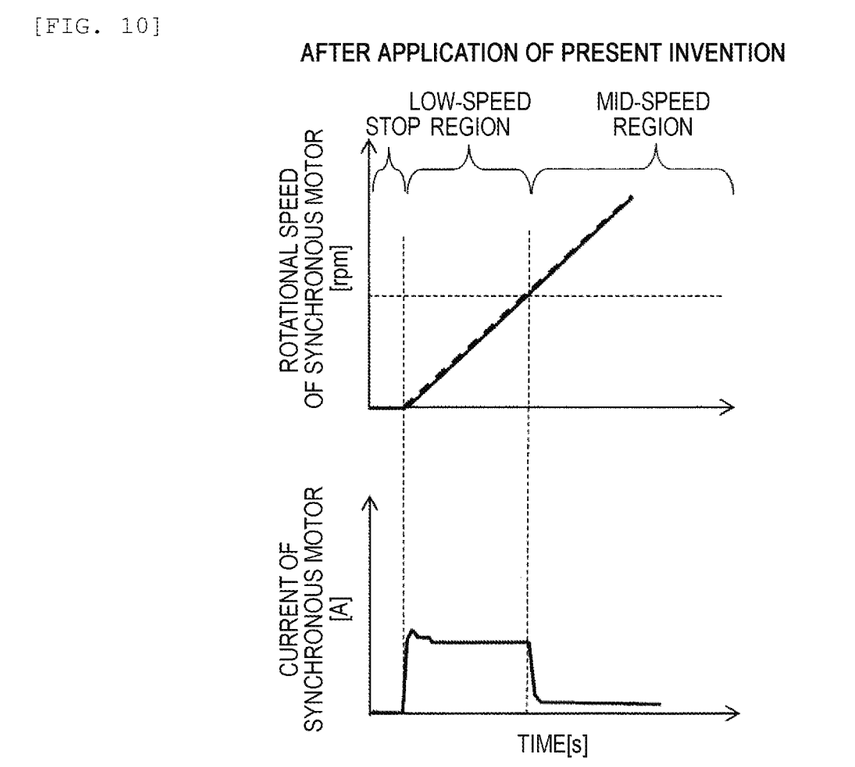
FIG. 10 is an acceleration characteristic diagram after application of the present invention.

FIGS. 9 and 10 show control characteristics before and after application of the voltage command compensator 24 according to the present invention. FIG. 9 is an acceleration characteristic before application of the present invention. The speed deviation $\Delta\omega_r$ occurs in the low-speed region, the rotational speed becomes discontinuous during switching to the mid-to-high-speed region, and a current jump-up occurs.

[0050]

FIG. 10 is an acceleration characteristic after application of the present invention. The rotational speed $\omega_r$ matches the rotational speed command value $\omega_r^*$ in the low-speed region, and continuity in the low-speed region and the mid-to-high-speed region is maintained, so current jump-up is prevented, and stable and highly accurate speed control characteristics can be realized.

Second Example

In the first example, the voltage correction value $\Delta v^*$ is calculated based on the phase deviation $\Delta\theta$ between the phase command value $\theta_{dcs}$ and the estimated value $\theta_{dc\_120}$ of the rotor position in the low-speed region, but in the present example shown in FIG. 11 uses an estimated value of the rotor speed (hereinafter referred to as an estimated speed value), instead of the estimated value of rotor position.

Figure 11:
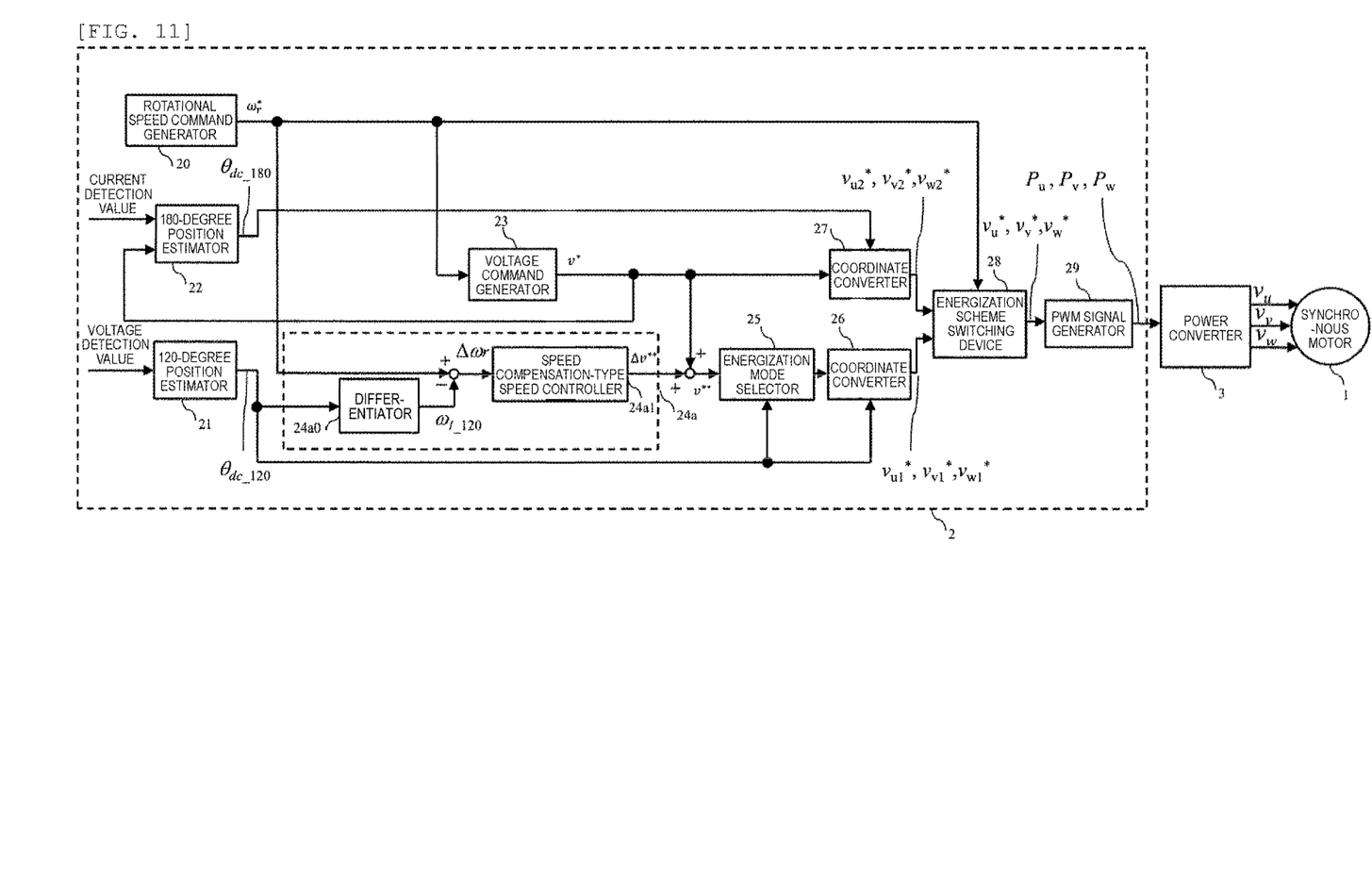
FIG. 11 is a configuration diagram of a second embodiment of the control apparatus according to the present invention.

1, 20 to 23, 25 to 29, and 3 in FIG. 11 are the same as those in FIG. 1.

A voltage command compensator 24a of the present example will be described.

The estimated value $\theta_{dc\_120}$ of the rotor position is input to the differentiator 24a0, the speed deviation $\Delta\omega r$ between the estimated speed value $\theta_{1\_120}$ of calculated according to Expression (5) and the rotational speed command value $\omega_r^*$ is obtained, and the speed compensation-type speed controller 24a1 calculates integral (I) control to calculate a voltage correction value $\Delta v^{**}$.

[Expression 5]

$$\omega_{1\_120} = \frac{d}{dt}\theta_{dc\_120} \quad (5)$$

Figure 12:
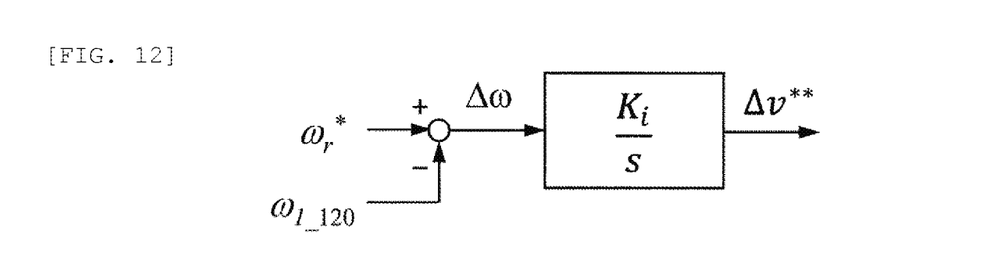
FIG. 12 is a configuration diagram of a speed compensation-type speed controller.

FIG. 12 shows the configuration of the voltage command compensator 24a.

The voltage correction value $\Delta v^{**}$ is calculated by control based on the speed deviation $\Delta\omega_r$ between the rotational speed command value $\omega_r^*$ and the estimated speed value $\omega_{1\_120}$. Here, $K_1$ is a gain of integral control.

A new $v_{qc}^{*}$ is calculated by replacing the voltage correction value $\Delta v^{}$ with $\Delta v_q^{}$, and adding $\Delta v_q^{}$ to the voltage command value $v_{qc}^*$ of the q axis as shown in Expression (6).

[Expression 6]

$$\begin{aligned} v_{dc}^* &= 0.0 \\ v_{qc}^{***} &= v_{qc}^* + \Delta v_q^{**} \end{aligned} \quad (6)$$

Even with the control configuration as in the present example, continuity in the low-speed region and the mid-to-high-speed region is maintained, so current jump-up is prevented, and stable and highly accurate speed control characteristics can be realized.

Third Example

Figure 13:
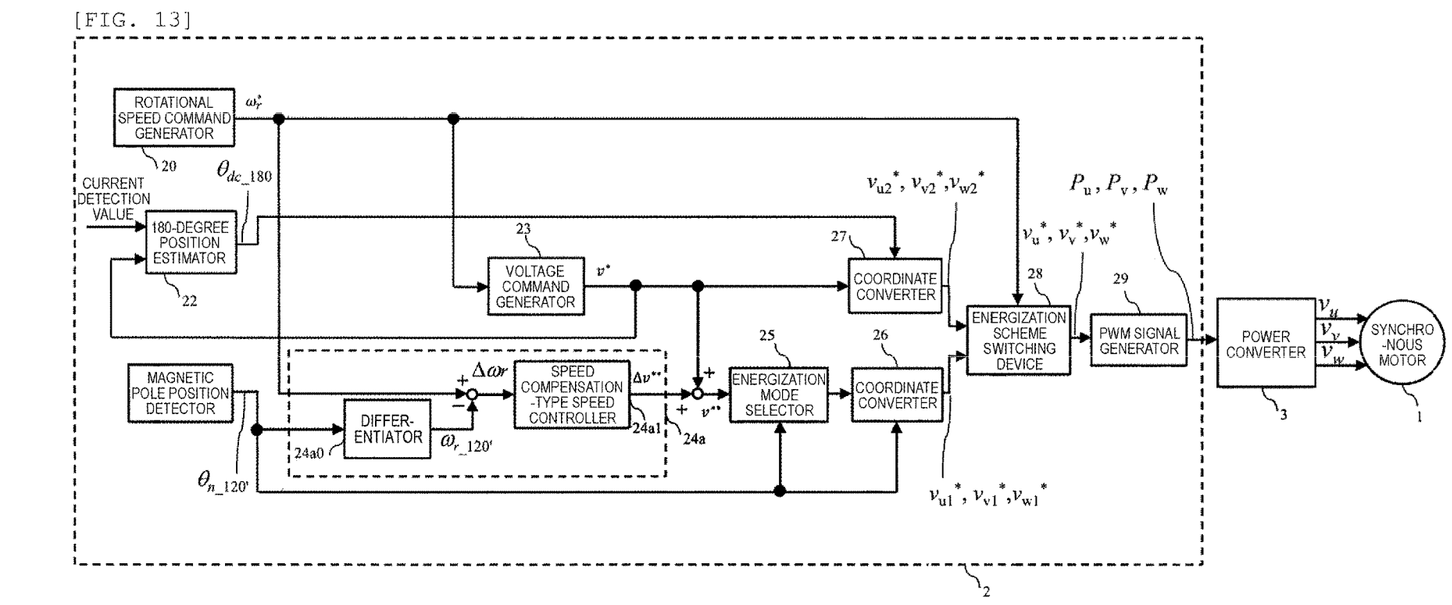
FIG. 13 is a configuration diagram of the second embodiment of the control apparatus according to the present invention.

In the first example, the rotor position is estimated in the high speed range, but in the present example shown in FIG. 13, the rotor position and the rotor speed are detected using the Hall IC which is an inexpensive position sensor.

1, 20, 22 to 29, and 3 in the drawing are the same as those in FIG. 1.

The magnetic pole position detector 21a of the present embodiment will be described. In the detection of the rotor speed, the detected speed value $\omega_{r\_120'}$ of the rotor speed is calculated according to Expression (7) using the magnetic pole position signal $\theta_{n\_120'}$ which can be detected every 60 degrees in one electrical angle rotation.

[Expression 7]

$$\omega_{r\_120'} = \frac{d}{dt} \theta_{n\_120'} \quad (7)$$

With respect to the low-speed region, as in the second example, the voltage correction value is calculated based on the speed deviation ($=\omega_r^* - \omega_{r\_120'}$) between the rotational speed command value $\omega_r^*$ and the detected speed value $\omega_{r\_120'}$, so even in a case of using an inexpensive rotor position sensor, continuity in the low-speed region and the mid-to-high-speed region is maintained, so current jump-up is prevented, and stable and highly accurate speed control characteristics can be realized.

In the first to third examples, the voltage correction value is added to the q-axis voltage command value, but the correction value maybe converted into a three-phase AC voltage command value and added to the three-phase AC voltage command value. Alternatively, the same effect can be obtained by using it for correction of the phase command value obtained by integrating the rotational speed command values or the rotational speed command value.

Fourth Example

Figure 14:
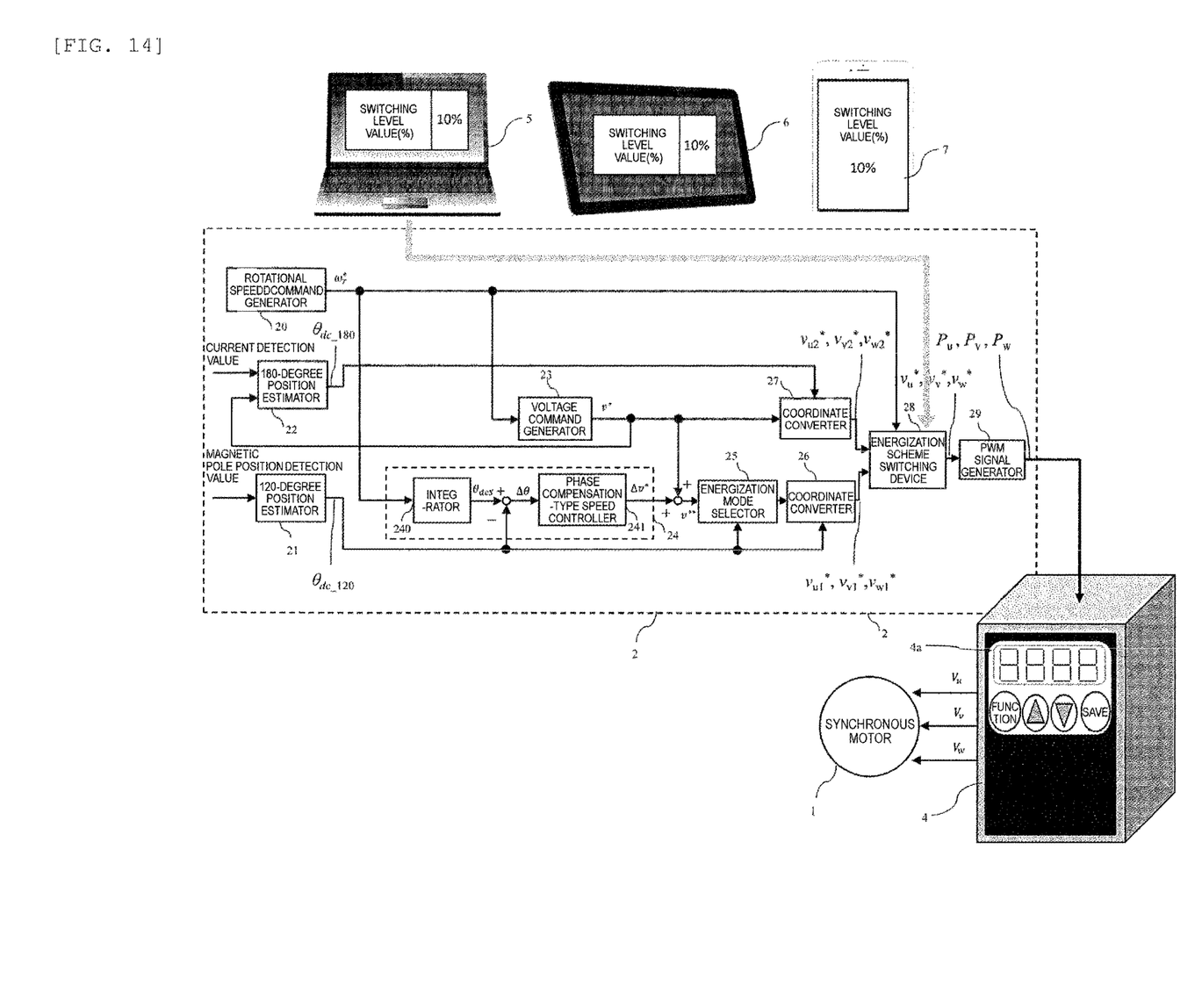
FIG. 14 is a configuration diagram of a synchronous motor control apparatus according to an example.

FIG. 14 is a configuration diagram of a synchronous motor control apparatus according to an example. The present example is an application of the present example to a synchronous motor drive system. In FIGS. 14, 1 and 2 are the same as those in FIG. 1.

The synchronous motor 1 which is a component in FIG. 1 is driven by the power conversion device 4. In the power converter 4, the 2 in FIG. 1 is implemented as software and hardware.

The level value for switching between the low-speed region and the mid-to-high-speed region may be set from the digital operator 4a of the power conversion device 4, the personal computer 5, the tablet 6, the smartphone 7, or the like.

It may also be set on a programmable logic controller, a local area network connected to a computer, or a field bus of a control apparatus.

If the present example is applied to a synchronous motor drive system, it is possible to prevent the current jump-up and to realize stable and highly accurate speed control characteristics.

Further, although the present embodiment is disclosed using the first example, it may be disclosed by the second and third examples. In the first to fourth examples, the switching elements constituting the power converter 2 may be silicon (Si) semiconductor elements, or wide band gap semiconductor devices of silicon carbide (SiC), gallium nitride (GaN), or the like.

The present invention can be applied to a synchronous motor control apparatus, for example, a synchronous motor control apparatus that estimates a rotor position to control a rotational speed and a torque.

REFERENCE SIGNS LIST

1: synchronous motor
2: controller
20: rotational speed command generator
21: 120-degree position estimator
21a: magnetic pole position detector
22: 180-degree position estimator
23: voltage command generator
24, 24a: voltage command compensator
240: integrator
24a0: differentiator
241: phase compensation-type speed controller
24a1: speed compensation-type speed controller
25: energization mode determiner
26, 27: coordinate converter
28: energization scheme switching device
29: PWM signal generator
3: power converter
4: power conversion device
4a: digital operator
5: personal computer
6: tablet
7: smartphone
$\omega_r^*$: rotational speed command value
$\omega_r$: rotational speed
$\Delta\omega_r$: speed deviation
$\theta_{dc\_120}$, $\theta_{dc\_180}$: estimated value of rotor position
$\theta_{n\_120}$: magnetic pole position signal
$\omega_{1\_120}$, $\omega_{1\_180}$: estimated speed value
$\omega_{r\_120}$: detected speed value
$v_{dc}^*$: current command value of d axis
$v_{qc}^*$, $v_{qc}^*$: current command value of q axis
$\Delta v^*$, $\Delta v^{**}$, $\Delta v_q^*$, $\Delta v_q^{**}$: voltage correction value
$v_{u1}^*$, $v_{v1}^*$, $v_{w1}^*$, $v_{u2}^*$, $v_{v2}^*$, $v_{w2}^*$, $v_u^*$, $v_v^*$, $v_w^*$: three-phase voltage command value
$P_u$, $P_v$, $P_w$: pulse width signal
$E_{ou}$, $E_{ov}$, $E_{ow}$: magnetic saturation induced voltage

The invention claimed is:

1. A synchronous motor control apparatus which drives a synchronous motor in a 120-degree energization scheme, according to a rotational speed command value, using a power converter that drives the synchronous motor, the synchronous motor control apparatus comprising:

any one of means for detecting a position of a rotor of the synchronous motor directly or by estimation, wherein an internal command value of the control apparatus is corrected based on a deviation between a detected speed value obtained by differentiating a value of the detected position and the rotational speed command value, and a low-speed region is driven at a 120-degree energization scheme, and a mid-to-high-speed region is driven at a 180-degree energization scheme, according to the rotational speed command value or the detected speed value of the synchronous motor.

2. A synchronous motor control apparatus which drives a synchronous motor in a 120-degree energization scheme, according to a rotational speed command value, using a power converter that drives the synchronous motor, the synchronous motor control apparatus comprising:

any one of means for detecting a position of a rotor of the synchronous motor directly or by estimation, wherein an internal command value of the control apparatus is corrected based on a deviation between a value of the detected position and a phase command value obtained by integrating the rotational speed command value, and the internal command value of the control apparatus is a voltage command value related to a torque component, an amplitude value of a three-phase voltage command value, a phase command value obtained by integrating the rotational speed command value, or the rotational speed command value.

3. A synchronous motor control apparatus which drives a synchronous motor in a 120-degree energization scheme, according to a rotational speed command value, using a power converter that drives the synchronous motor, the synchronous motor control apparatus comprising:

any one of means for detecting a position of a rotor of the synchronous motor directly or by estimation, wherein an internal command value of the control apparatus is corrected based on a deviation between a value of the detected position and a phase command value obtained by integrating the rotational speed command value, and a low-speed region is driven at a 120-degree energization scheme, and a mid-to-high-speed region is driven at a 180-degree energization scheme, according to the rotational speed command value or the detected speed value of the synchronous motor.

4. The synchronous motor control apparatus according to claim 3, wherein in the low-speed region, a rotational speed is 10% or less of a rated rotational speed of the synchronous motor, and in the mid-to-high speed region, the rotational speed is 10% or more of the rated rotational speed.

5. The synchronous motor control apparatus according to claim 3, wherein a level value for switching the energization scheme of the synchronous motor is set from the outside of the control apparatus.

6. The synchronous motor control apparatus according to claim 5, wherein the outside of the control apparatus is a personal computer, a tablet, or a smart phone which is an external device, and the level value for switching the energization scheme of the synchronous motor is capable of being freely set and changed through the personal computer, the tablet, or the smart phone.

7. The synchronous motor control apparatus according to claim 5, wherein the outside of the control apparatus is a programmable logic controller which is a host device, a local area network connected to a computer, or a field bus of a control apparatus, and the level value for switching the energization scheme of the synchronous motor is capable of being freely set and changed through the programmable logic controller, the local area network, or the field bus of the control apparatus.

* * * * *